United States Patent Office 3,324,441
Patented June 6, 1967

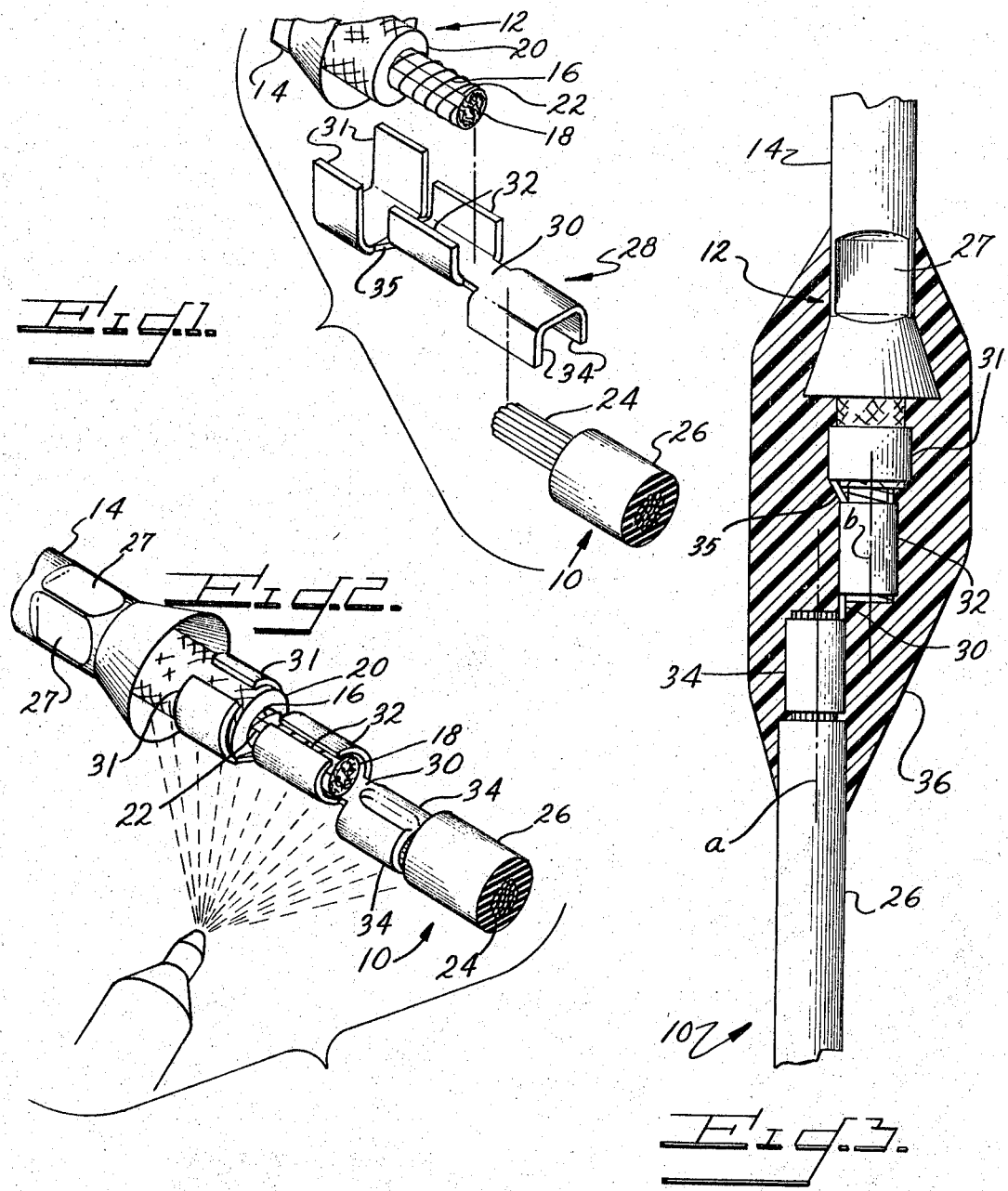

3,324,441
HERMETICALLY SEALED ELECTRICAL
CONNECTIONS
Joseph A. Olsen, Springfield, and Peter J. Fessenden, East Longmeadow, Mass., assignors to Springfield Wire, Inc., a corporation of Massachusetts
Filed Dec. 8, 1964, Ser. No. 416,702
2 Claims. (Cl. 338—332)

The present invention relates to electrical connectors, and more particularly to connectors used in forming vapor sealed connections between electrical apparatus and lead wires.

Electric heating units have in recent years come into widespread use for a variety of purposes including refrigerator defrost heaters and the like. Defrost heaters usually comprise a resistance heating cable disposed within a metal tube. The cable may be formed by spirally winding a fine wire around a core of insulating material and may be insulated by any suitable material, including fibrous asbestos. According to accepted practice, the connection between the resistance cable and lead wire is encapsulated or sealed in plastic or rubber, molded about the connection so as to form a moisture seal for the connection and the end of the metal tube. In spite of this protective seal, it has been found that moisture-containing air finds its way into the heater along the wire of the electrical lead and then along the wire and core of the heating cable, especially if the ends of the lead wire and heater wire are butted together. With successive cyclings of a refrigerator defrost heater, moisture will eventually condense and, if sufficient moisture is present within the tube, it will cause a short circuit between the tube and the resistance heating wire.

The principal object of this invention is to provide an improved connection for use in coupling a heating unit and an electrical conductor which overcomes the moisture problem, and at the same time provides a compact connection of short length so that it is adaptable to compact design requirements when employed in a refrigerator or the like.

The above and other related objects, as well as the novel features of the invention, will be apparent from a reading of the following description of the disclosure found in the accompanying drawing and the novelty thereof pointed out in the appended claims.

In the drawing:

FIG. 1 is an exploded perspective view illustrating an assembly step in forming a connection in accordance with the present invention;

FIG. 2 is a perspective view illustrating a further step in the forming of a connection in accordance with the present invention; and FIG. 3 is a view partially in section of an electrical connection embodying the present invention.

In accordance with this invention, a hermetically sealed connection is provided between an electrical conductor or lead wire 10 and an electrical resistance heating unit 12. The type of heating unit herein referred to, as has been pointed out, has particular utility in automatic defrost units for refrigerators and advantageously takes the form disclosed and claimed in U.S. Patent No. 3,045,102.

The heating unit 12 (FIG. 1) comprises a metal tube 14 having therein a resistance cable comprising an electrical resistance wire 16, spirally or helically wound around a flexible core 18, which may be in the form of a continuous length of flexible, heat-resistant material, such as asbestos, fiber glass, or the like. The resistance wire is sheathed within an insulating cover 20 which may also be formed of asbestos, fiber glass or similar insulating material having high heat resistance. The heating cable preferably includes an unheated or cold terminal formed by an elongated strip or wire 22 of conductive material, of low resistance, in contact with turns of the spirally or helically wound resistance wire 16 adjacent the terminal ends of the cable. The wire 22 extends from within to without the tube 14 so that substantially no heat is generated at the ends of the heater where overheating would result because of the low rate of heat transfer at these locations.

The conductor wire 10 may be of any conventional manufacture, and as shown, comprise conductor wires 24 sheathed by flexible insulation 26 which may be a suitable synthetic plastic or rubber.

As will be seen, the terminal end portion of the metal tube 14 is flared outwardly and the tube 14 is also crimped adjacent its ends as at 27 whereby the resistance cable is firmly clamped in place in the tube and the sealing material is prevented from flowing into the tube during molding. The electrical resistance cable extends beyond the end of the tube 14 and, as shown in FIG. 1, the insulation 29 is cut away, to expose the end of the "cold terminal" provided by the conductive strip 22 and turns of resistance shorted thereby. Similarly, the insulating cover 26 of conductor wire 16 is cut away exposing a short length of the electrical conductors 24.

A metal connector 28 provides both mechanical and electrical connection between the lead 10 and the electric resistance element. The connector comprises an integral metal strip shaped to provide clamp means 31 for securing the connector about the end of the heater insulation, a clamp means 32 for securing the connector into the exposed end of heater wire, and another clamp 34 for securing the connector onto the conductor wires 24, as shown in FIG. 2. As shown, each of the clamp means is in the form of a pair of arms. The arms of clamps 32 and 34 extend in opposite directions from a web 30 which electrically and mechanically interconnects these two clamps. A web 35 similarly interconnects clamp means 31 and 32. The arms of clamp 31 are larger than those of the other clamps so as to accommodate the larger diameter of the insulated portion of the heater cable.

FIG. 1 illustrates the lead 10, heating unit 12, and connector 28, positioned ready for assembly. FIG. 2 shows the completed assembly, with the two upwardly extending arms of clamp 31 clinched around the insulating layer 20, the arms of clamp 32 clinched on the resistance wire 16, and the arms forming clamp 34 clinched around the conductor of the lead wire 10.

The connection thus formed is next sealed to prevent moisture contacting the connection or migrating into the heater. Encapsulation is accomplished by molding a suitable material about the connection zone which may first be treated or coated with a suitable primer or bonding agent, which as shown in FIG. 2, may be applied by spraying. If the encapsulating material to be used is neoprene, a neoprene emulsion is applied to all portions of the connections extending from beyond the end of the metal of tube 14 to beyond the end of the conductor 10.

After priming, the connection zone is placed into a suitably shaped mold and a molded neoprene encapsulation 36 is formed under heat and pressure in the usual fashion. It will be noted that the crimped portion 27 of the tube 14 prevents axial movement of the heating cable during the molding operation and also prevents the softened molding compound entering the tube 14.

Referring to FIG. 3, it will be seen that in the completed coupling or connection, axis $a$, of the lead wire 26 to which is secured clamp 34, is laterally offset from axis $b$ of the heating cable 12 to which is secured clamp 32. There is thus no possibility that the ends of these two wires will be placed in abutting relation, whereby moisture could migrate along the conductors 24 of lead wire 10 and into the core of the heating cable.

This arrangement thus minimizes the care and skill ordinarily required to prevent butting together the lead wire and heating cable when conventional in-line connectors are used. In accordance with this invention, a biaxial connector is provided which not only eliminates improper assembly, but does so in a moisture-proof connection of compact longitudinal size.

The critical zone in preventing moisture migration into the heater is the area between adjacent ends of the lead wire and heater cable. In accordance with this invention, the web 30 not only provides the electrical and mechanical coupling between these two conductive elements, but also provides a moisture barrier therebetween since the encapsulating material is bonded to the primed metal surface of the web. The use of neoprene and a neoprene emulsion insure an excellent moisture seal about the entire connection and along the only possible moisture path, i.e., web 30.

In summary, this invention provides a strong mechanical connection of a heater and lead wire by providing clamping means for both the insulated and exposed portions of the heater cable. In addition, clamping means for the lead wire and heater are disposed to provide a compact laterally offset, biaxial coupling, thereby eliminating moisture penetration problems. Further moisture sealing is provided by a molded sealing material bonded to the surfaces of the heater, connector and lead wire.

Having thus described this invention, we claim:

1. Connection for an electrical conductor wire and an insulated integral heating cable disposed within a metal tube and having its terminal end extending outwardly thereof, comprising an integral metal connector having a first clamp portion for securing the connector to said connector wire, a second clamp means extending in the opposite direction from the first clamp means for securing to the conductor of said electrical heater, a third clamp means for securing about the end of the insulation of said heater cable, said first and second clamp means extending in opposite directions whereby the axes of said conductor wire and heater cable are offset laterally when secured to said clamp means, a web interconnecting said first and second clamp means and an encapsulation molded about said connection, the molding material being bonded to the metal of said connector providing a moisture barrier between the ends of the conductor and heating cable.

2. A connection between an insulated electrical conductor wire and an electrical heating unit comprising a metal tube flared outwardly of its terminal end and further comprises a resistance heating cable disposed therein and insulated by a fibrous material, said cable being formed of a fine conductor wire helically wound about a flexible core and a longitudinally extending conductive strip disposed along each of the outer end portions of the cable and contacting the coils of the resistance wire and thereby forming unheated terminal ends on said heating cable, an integral metal connector having one pair of arms extending in one direction and clinched about the layer of asbestos insulation, a second pair of arms extending in the same direction as the first pair of arms and clinched about the coils of the electrical resistance wire, and a third pair of arms extending opposite the second pair and clinched about the conductor wire, said connector including a web interconnecting said second and third pairs of arms and disposed between the ends of the conductor wire and the heating cable, said connection being encapsulated in an insulating moisture barrier material from a point inwardly of the terminal end of the insulation of the electrical cord to a point inwardly of the terminal end of the metal conduit.

References Cited
UNITED STATES PATENTS

| | | | |
|---|---|---|---|
| 2,727,120 | 12/1955 | Boggs | 174—75 |
| 2,813,922 | 11/1957 | Arnold | 174—77 X |
| 2,862,041 | 11/1958 | Beachley | 174—76 X |
| 3,128,143 | 4/1964 | Sitzler | 339—223 |
| 3,185,762 | 5/1965 | Shaw | 174—71 |
| 3,225,321 | 12/1965 | Walter | 338—274 |

RICHARD M. WOOD, *Primary Examiner.*

J. G. SMITH, *Assistant Examiner.*